June 22, 1943.　　R. D. O'CALLAGHAN　　2,322,384
EMERGENCY DRIVE RELEASE FOR WRINGERS OR THE LIKE
Filed Feb. 3, 1940　　2 Sheets-Sheet 1

INVENTOR.
R. D. O'CALLAGHAN
BY M. Talbert Dick
ATTORNEY.

June 22, 1943. R. D. O'CALLAGHAN 2,322,384
EMERGENCY DRIVE RELEASE FOR WRINGERS OR THE LIKE
Filed Feb. 3, 1940 2 Sheets-Sheet 2
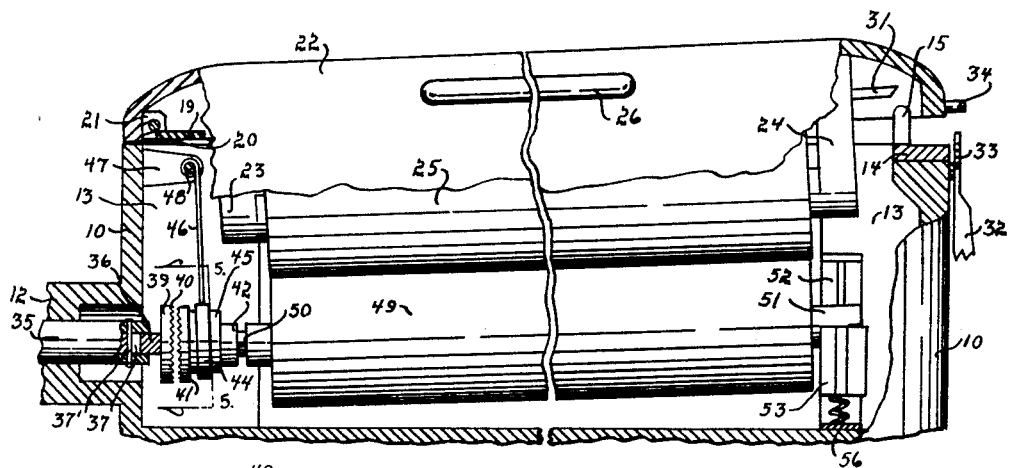
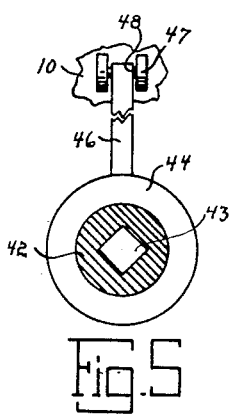
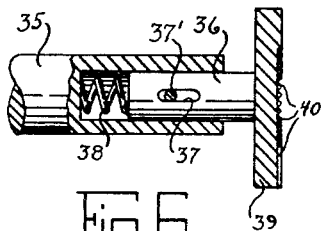
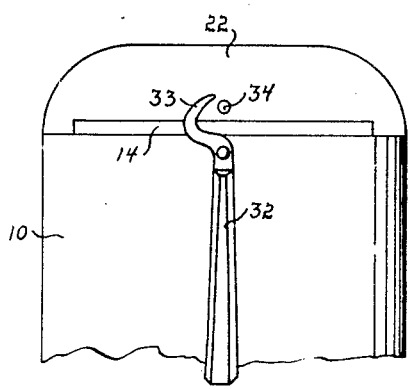
INVENTOR.
R.D. O'CALLAGHAN
BY M. Talbert Dick
ATTORNEY.

UNITED STATES PATENT OFFICE 2,322,384

EMERGENCY DRIVE RELEASE FOR WRINGERS OR THE LIKE

Robert D. O'Callaghan, Des Moines, Iowa

Application February 3, 1940, Serial No. 317,134

4 Claims. (Cl. 68—253)

The principal object of this invention is to provide an emergency drive release for wringers or the like which will permit the releasing of the wringer rolls and the stopping of the power transmission to the drive roll of the wringer when the releasing lever is touched or manually manipulated.

A further object of this invention is to provide an emergency drive release for wringers or the like which will automatically disengage the power driven roll of the wringer from the power unit quickly and effectively when the manual release control is actuated. More specifically, the object of my invention is to provide a wringer wherein, should an emergency arise, the two wringer rolls may not only be disengaged from each other, but the action of this release will prevent the rotation of the power driven roll of the wringer.

A still further object of my invention is to provide an emergency drive release for wringers or the like that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth and pointed out in my claims and illustrated in the accompanying drawings, in which:

Fig. 4 is a side partial sectional view of my wringer with the roll in the released position.

Fig. 5 is an enlarged end sectional view of the clutch bearing carrier and arm, taken on the line 5—5 of Fig. 4.

Fig. 6 is an enlarged cross sectional view of the driven shaft and clutch plate.

Fig. 7 is an end elevational view of the wringer showing the locking lever for aiding in the closing of the wringer.

Fig. 8 is a fragmentary top plan view showing the latch releasing mechanism.

Figure 1:
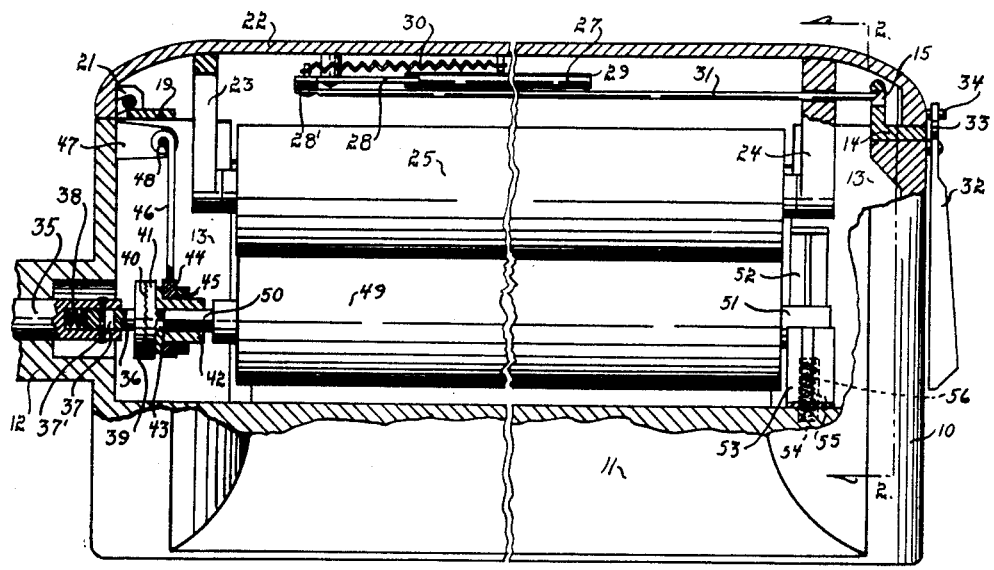
Fig. 1 is a side partial sectional view of a wringer showing my release mechanism.
Figure 2:
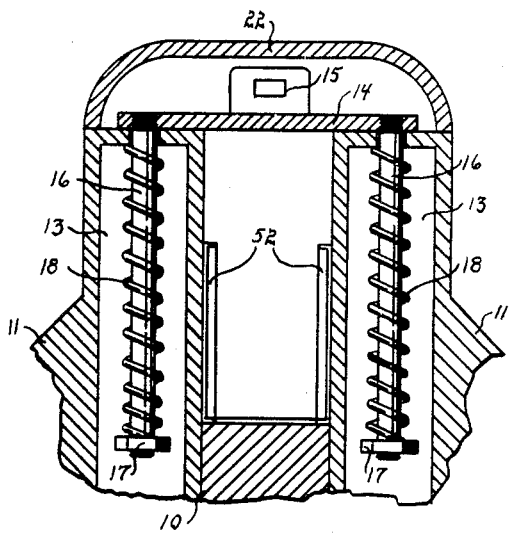
Fig. 2 is an end sectional view of the wringer taken on the line 2—2 of Fig. 1.
Figure 3:
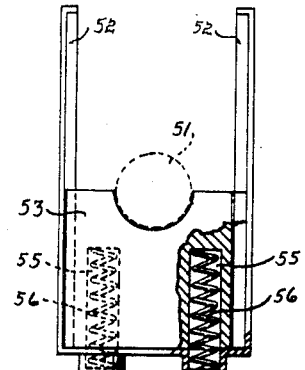
Fig. 3 is an enlarged end view of the wringer bearing carrier and actuating springs.

Heretofore, safety catches employed on wringers have been of two general types. The first type merely released the upper roll from contact with the power driven roll and the power driven roll continued to rotate. The second type, through the use of very complicated mechanisms, released the power driven roller by this action, but this operation was so delayed through the use of the complicated mechanism as to make this release ineffective. These previous emergency releases had many disadvantages, they were complicated in structure, unreliable in usage, were slow to function, and were liable to many breakdowns.

I have overcome such disadvantages as will be appreciated and as will be hereinafter more fully set forth.

Referring to the drawings, I have used the numeral 10 to designate the wringer frame proper having the ordinary drain boards 11 and shaft housing journal 12. The numeral 13 indicates housings formed in the frame 10 for receiving springs as will be hereinafter described. There are two of these housings 13 at each end of the frame 10. The numeral 14 indicates a releasing plate having thereon the latch socket 15 which is of the usual type. The numeral 16 indicates elongated bolt members secured to the plate 14, extending through the frame 10, and into the wells or housings 13. Upon the lower end of each of these bolt members is placed a retainer or nut 17. The numeral 18 indicates a compression spring imposed between the upper end of the housing 13 and the retainer 17. Thus the plate 14 is yieldingly held in a lowered position through the medium of the above mentioned mechanism. Similarly the numeral 19 indicates a plate on the other end of the frame 10 which is secured to the frame 10 in the same manner as is the plate 14 and through the medium of bolts 20 which are similar to the bolts 16. The numeral 21 designates a hinge member or hook secured to the plate 19. I have used the numeral 22 to indicate a cover or upper frame portion having one end hinged to the hinge member 21' as shown in the drawings. This cover 22 has rigidly secured therein the two bearing members 23 and 24 which rotatably support an ordinary wringer roll 25. The numerals 26 and 27 indicate handle members positioned and extending externally of the cover 22 and having the arms 28 and 28' thereon which extend inside the housing through the slots 29 and which are suitably pivoted to the lid or cover 22. The numeral 30 indicates a tension spring having one end secured to the junction of the arms 28 and 28' and its other end rigidly secured to the cover 22. The numeral 31 indicates an elongated rod having one end secured to the pivot joint of the arms 28 and 28', which rod is slidably bearinged in the journal membed 24 and capable of detachably engaging the latch socket 15 at times.

Thus when the rod 31 is an engagement with the latch socket 15 and it is desired to release the cover 22, the handle members 26 and 27 are manually operated, thus causing the arms 28 and 28' to pivot against the tension of the spring 30, thereby pulling the rod 31 out of engagement with the latch socket 15. By the use of the springs 18 about the bolts 16 and 20, the upper roll as well as the entire upper portion of the wringer, including the cover 22, may raise or lower dependent upon the space required by the wringer rolls. The numeral 32 indicates a lever pivotally secured to the end of the frame 10 and having a hook shaped portion 33 on its upper end. The numeral 34 indicates a stud or pin rigidly secured to the cover 22 on its end portion, thus when it is desired to close the cover so that the end of the rod 31 will be in engagement with the latch socket 15 against compression, the lever 32 may be actuated so that the hook portion engages the pin 34, thus bringing the lid or cover 22 into tight engagement with the frame 10 so that the rod 31 will engage the latch socket 15. The numeral 35 indicates the power driven shaft which is journaled in the journal member 12 and has one of its ends in engagement with a suitable source of power. The end of the shaft which extends within the frame 10 is recessed to slidably receive a shaft 36. This shaft 36 has an elongated slot 37 cut therethrough for receiving a pin 37' which is rigidly secured to the shaft 35, thus preventing the independent rotation of the shaft 36 relative to the shaft 35 while at the same time permitting the reciprocating movement of the shaft 36. The numeral 38 indicates a compression spring imposed between the end of the shaft 36 and the inside bottom portion of the recession within the shaft 35 as shown in Figs. 1 and 6 for yieldingly holding the shaft 36 in its outward or extended portion. The numeral 39 indicates a clutch plate rigidly secured to the outer end of the shaft 36 and having on its outer surface the teeth or like 40. I have used the numeral 41 to indicate a second clutch plate having thereon meshing teeth or like for meshing with the teeth 40 of the clutch plate or disc 39. Secured to the plate 41 is a shaft 42 having therein a square recession or female spline joint 43. The numeral 44 indicates a bearing ring rotatably supporting the shaft 42 and being held in place thereon through the medium of a shoulder formed on the shaft 42 and a ring 45. The numeral 46 indicates an arm secured to the bearing ring 44 and extending upwardly. The numeral 47 indicates a hanger rigidly secured to the frame 10 and having thereon a pivot point or rod 48 for pivotally holding the upper end of the arm 46. The numeral 49 indicates a lower wringer roller of the usual type having thereon a male spline shaft 50 capable of engagement with the spline socket 43 and secured against independent rotation relative thereto. The numeral 51 indicates a stub shaft formed on the other end of the roll 49. The numeral 52 indicates two spaced apart guide tracks rigidly secured within the frame 10 by the housings 13. The numeral 53 indicates a carrier slidably mounted within the tracks or guides 52 and supporting the stub shaft 51. The numerals 54 indicate sockets formed in the lower horizontal end of the guide 52 and the numeral 55 indicates sockets or holes cut in the bottom portion of the carrier 53. The numerals 56 indicate compression springs having one end within the sockets 54 and the other end resting within the inside bottom portion of the holes 55. Thus when pressure is released on the roll 49, the compression springs 56 force the carrier 53 upwardly, carrying therewith the stub shaft 51 for tilting the roll 49 which will pivot on the point 48 through the medium of the arm 46 and ring 44 and bring the plate 41 out of engagement with the plate 39, thus detaching the roll 49 from the power shaft 45 whenever the carrier 53 is permitted to be forced upwardly by the springs 56. Obviously any type of clutch plate friction means may be used instead of the teeth 40, such as leather, cork or the usual type of friction means.

The practical operation of my device is as follows: When the wringer is in an operating position, the mechanism is in the position shown in Fig. 1, and the roll 49 is being driven through the medium of the clutch plates 39 and 41, the shaft 36 and the shaft 35. The end of the rod 31 is in engagement with the latch socket 15. Thus as clothes are fed between the rolls 25 and 49, the plates 14 and 19 may rise against the tension of the springs 18 and permit the clothes to pass between the rollers 25 and 49, but should an obstruction be placed between the rolls 25 and 49, such as the hand of the operator, the operator may then touch the handle 26 or 27, thereby releasing the rod 31 from engagement with the latch 15, causing the cover 22 to pivot upwardly. This release of pressure will also permit the springs 56 to push the carrier 53 upwardly, thus pushing one end of the roll 49 upwardly, causing the arm 46 to pivot at the pivot point 48 which is above the impulse axis of the roll 49, thus bringing the plates 39 and 41 out of engagement with each other, thus stopping the power impulse into the roll 49. This position is shown in Fig. 4. Obviously by this construction, the movement of the cover 22 has to be but slight in order to cause the clutch plates to disengage each other and inasmuch as the pivot point of the arm 46 is above the center, a slight tilting of the roll 49 will cause this arm to pivot, bringing the two clutch plates out of engagement. When it is desired to replace the cover 22 to its original position and against the compression of the springs 56, the cover is manually pushed to position and then the lever 32 touched in order to force the cover 22 more tightly against the frame 10 so that the bar or rod 31 would engage the latch socket 15. After the lever 32 is used to facilitate the manual lowering of the cover 22 and into a fastened condition, the weight of the lever 32 when released will cause it to assume a position as shown in Fig. 7 and out of contact with the pin 34 in order that when the handle 26 or handle 27 is touched, the cover may raise upwardly without interference from the lever 32.

Thus it will be seen that I have provided an emergency drive release for wringers or the like which fulfills all of my objects and provides many more obvious advantages. My device is quick in action, is simplified in structure, positive, and by this arrangement, the quick releasing handles 26 and 27 can be so made that a very slight touch will release the wringer rolls from each other and shut off the power transmission to the lower roller immediately.

Some changes may be made in the construction and arrangement of my improved emergency drive release for wringers or the like without departing from the real spirit and purpose of my invention, and it is my intention to cover by my claims any modified forms of structure or use of

I claim:

1. In a device of the class described, a lower frame portion, a cover element hingedly secured to said lower frame portion, a roller rotatably mounted in said cover portion, a lower roller operatively mounted in said lower frame portion, a carrier member vertically slidably mounted in said lower frame and capable of rotatably supporting one end of said lower roller, a means for yieldingly holding said carrier in an upward direction, a drive shaft, a clutch plate secured to said drive shaft inside said lower frame portion, a second clutch plate secured to said lower roller against independent rotation relative thereto, a bearing for rotatably supporting said second mentioned clutch plate, an arm having one end secured to said bearing and its other end pivotally secured to said lower frame portions; said second mentioned clutch plate being capable of disengaging from said first mentioned clutch plate when said carrier is forced upwardly by said yielding means and pivoting said arm, and a catch means for operatively holding said upper frame and said upper roller in a lowered position with said upper roller in operative engagement with said lower roller whereby said lower roller is held in a lowered operative position.

2. In a device of the class described, a lower frame portion, a cover member hingedly secured to the lower frame portion, an upper roller rotatably mounted and supported by said cover, a means for detachably securing one end of said cover to said lower frame, a release element for disengaging said cover from said lower frame at times, permitting said cover to hinge upwardly, a lower roller, a means for operatively supporting one end of said lower roller and yieldingly forcing that end of said roller upwardly, a clutch plate secured to the other end of said lower roller, a means for pivotally operatively securing said clutch plate to said lower frame, a drive shaft, and a clutch plate operatively secured to said drive shaft; said first and said second mentioned clutch plates being in operative engagement with each other when said cover is in a closed position and capable of disengagement from each other when said cover is hinged upwardly.

3. In a device of the class described, a frame member, a carrier member vertically slidably mounted in one end of said frame member, vertical springs for forcing said carrier in an upward direction, a roller having one end rotatably mounted on said carrier, a clutch element secured to the other end of said roller, a means for operatively rotatably supporting said clutch element, a drive shaft journaled in said frame, a clutch element operatively secured to said drive shaft and inside said frame, a cover element hingedly secured to said frame, an upper roller rotatably mounted in said cover portion and capable of operatively contacting said first mentioned roller when said cover is in a lowered position relative to said frame, a means for detachably securing said cover to said frame at times, and a release element having handles external of said cover portion for permitting the manual release of said cover, permitting it to hinge upwardly at times; said first mentioned clutch element being in engagement with said clutch element on said drive shaft for operating said first mentioned roller when said cover portion is secured to said frame, and said carrier forcing one end of said first mentioned roller upwardly and disengaging said first mentioned clutch element from said second mentioned clutch element when said releasing element is actuated, permitting said cover portion to hinge upwardly.

4. In a device of the class described, a frame member, a carrier member vertically slidably mounted in one end of said frame member, springs for forcing said carrier in an upward direction, a roller having one end rotatably mounted on said carrier, a clutch element secured to the other end of said roller, a means for operatively rotatably supporting said clutch element, a drive shaft journaled in said frame, a clutch element operatively secured to said drive shaft and inside said frame, a cover element hingedly secured to said frame, an upper roller rotatably mounted in said cover portion and capable of operatively contacting said first mentioned roller when said cover is in a lowered position relative to said frame, a means for detachably securing said cover to said frame at times, a release element having handles external of said cover portion for permitting the manual release of said cover, permitting it to hinge upwardly at times; said first mentioned clutch element being in engagement with said clutch element on said drive shaft for operating said first mentioned roller when said cover portion is secured to said frame, and said carrier forcing one end of said first mentioned roller upwardly and disengaging said first mentioned clutch element from said second mentioned clutch element when said releasing element is actuated, permitting said cover portion to hinge upwardly, and a catch means for holding said upper cover member in a lowered position at times.

ROBERT D. O'CALLAGHAN.